United States Patent [19]
Bradley

[11] Patent Number: 5,735,566
[45] Date of Patent: Apr. 7, 1998

[54] TRUCK BOX ACCESSORY ATTACHMENT SYSTEM

[76] Inventor: E. Phil Bradley, 2207 Fox Hunt Dr., Monroe, N.C. 28110

[21] Appl. No.: 682,117

[22] Filed: Jul. 17, 1996

[51] Int. Cl.$^6$ ........................................... B60P 7/02
[52] U.S. Cl. ........................... 296/164; 296/167; 296/100
[58] Field of Search ........................ 296/100, 156, 296/164, 167

[56] References Cited

U.S. PATENT DOCUMENTS

| | | | |
|---|---|---|---|
| 4,648,649 | 3/1987 | Beal | 296/156 |
| 5,305,774 | 4/1994 | Hager | 296/100 X |
| 5,470,124 | 11/1995 | Ernst | 296/164 X |

Primary Examiner—Joseph D. Pape

[57] ABSTRACT

A new Truck Box Accessory Attachment System for offering an easier manner of mounting a truck box accessory to a truck box. The inventive device includes a truck female rail, an attachment male rail, and a slide locking device. In use, the truck female rail (20) is aligned with an alignment tool (70) and attached to a pickup truck (12). The alignment tool (70) is comprised of the support stem (33), the right rail (31), and the left rail (32) and a horizontal tool bar (72) which is fastened at its ends to the support stem (33) by an end attachment fastener (76) and is lengthwise adjustable by virtue of a rail spacing adjustment structure (74). Parallel alignment of the truck female rail (20) at a variety of spaced distances is accomplished by use of the alignment tool (70).

8 Claims, 4 Drawing Sheets

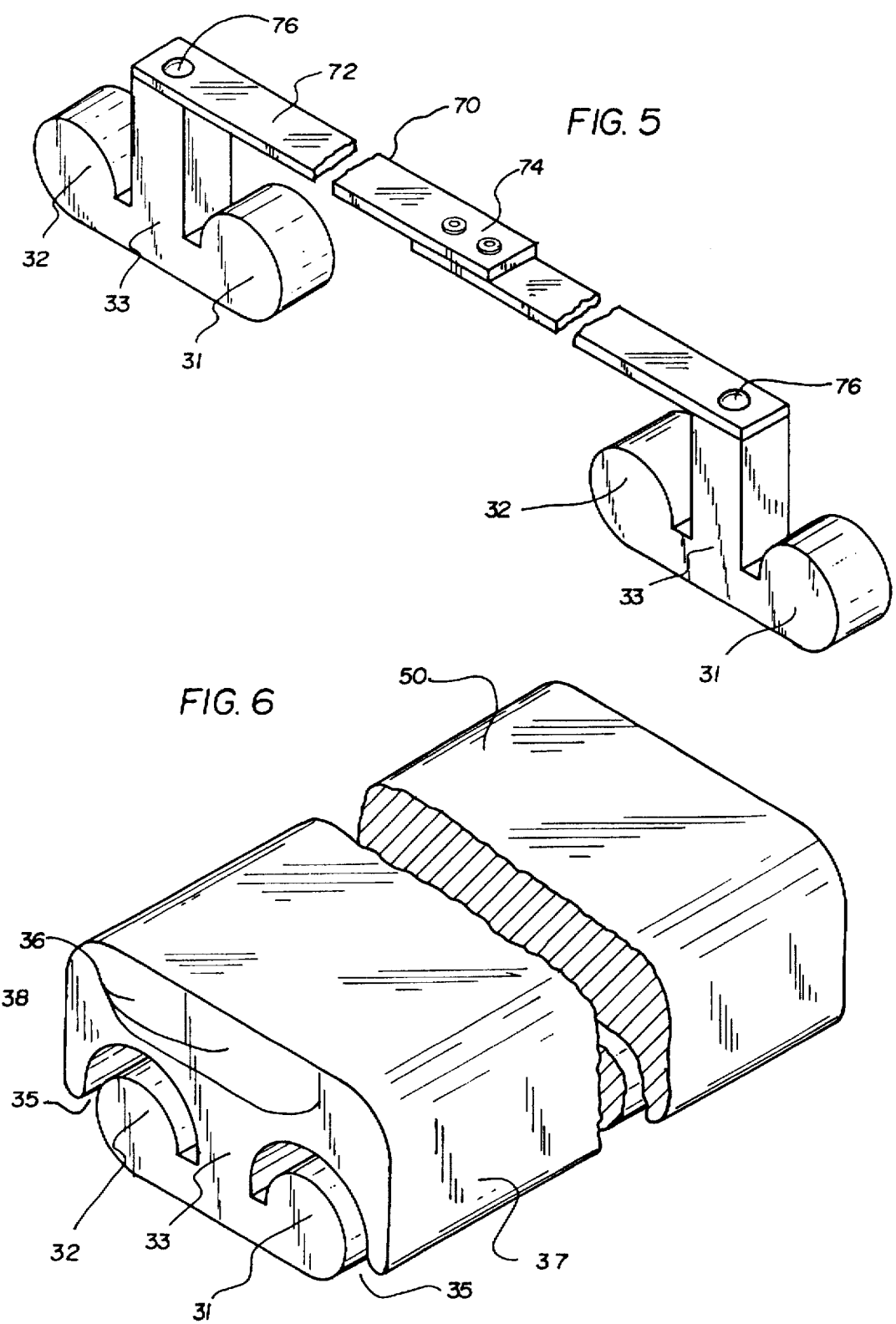

TRUCK BOX ACCESSORY ATTACHMENT SYSTEM

BACKGROUND OF THE INVENTION

1. Field of the Invention

The present invention relates to truck box accessories and more particularly pertains to a new Truck Box Accessory Attachment System for offering an easier manner of mounting a truck box accessory to a truck box.

2. Description of the Prior Art

The use of truck box accessories is known in the prior art. More specifically, truck box accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art truck box accessories include U.S. Pat. No. 5,263,761; U.S. Pat. No. 4,815,787; U.S. Pat. Des. No. 349,036; U.S. Pat. No. 5,002,324; U.S. Pat. No. 4,423,899, and U.S. Pat. No. 4,958,875.

While these devices fulfill their respective, particular objectives and requirements, the aforementioned patents do not disclose a new Truck Box Accessory Attachment System. The inventive device includes a truck female rail, an attachment male rail, and a slide locking device.

In these respects, the Truck Box Accessory Attachment System according to the present invention substantially departs from the conventional concepts and designs of the prior art, and in so doing provides an apparatus primarily developed for the purpose of offering an easier manner of mounting a truck box accessory to a truck box.

SUMMARY OF THE INVENTION

In view of the foregoing disadvantages inherent in the known types of truck box accessories now present in the prior art, the present invention provides a new Truck Box Accessory Attachment System construction wherein the same can be utilized for offering an easier manner of mounting a truck box accessory to a truck box.

The general purpose of the present invention, which will be described subsequently in greater detail, is to provide a new Truck Box Accessory Attachment System apparatus and method which has many of the advantages of the truck box accessories mentioned heretofore and many novel features that result in a new Truck Box Accessory Attachment System which is not anticipated, rendered obvious, suggested, or even implied by any of the prior art truck box accessories, either alone or in any combination thereof.

To attain this, the present invention generally comprises a truck female rail, an attachment male rail, and a slide locking device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Truck Box Accessory Attachment System apparatus and method which has many of the advantages of the truck box accessories mentioned heretofore and many novel features that result in a new Truck Box Accessory Attachment System which is not anticipated, rendered obvious, suggested, or even implied by any of the prior art truck box accessories, either alone or in any combination thereof.

It is another object of the present invention to provide a new Truck Box Accessory Attachment System which may be easily and efficiently manufactured and marketed.

It is a further object of the present invention to provide a new Truck Box Accessory Attachment System which is of a durable and reliable construction.

An even further object of the present invention is to provide a new Truck Box Accessory Attachment System which is susceptible of a low cost of manufacture with regard to both materials and labor, and which accordingly is then susceptible of low prices of sale to the consuming public, thereby making such Truck Box Accessory Attachment System economically available to the buying public.

Still yet another object of the present invention is to provide a new Truck Box Accessory Attachment System which provides in the apparatuses and methods of the prior art some of the advantages thereof, while simultaneously overcoming some of the disadvantages normally associated therewith.

Still another object of the present invention is to provide a new Truck Box Accessory Attachment System for offering an easier manner of mounting a truck box accessory to a truck box.

Yet another object of the present invention is to provide a new Truck Box Accessory Attachment System which includes a truck female rail, an attachment male rail, and a slide locking device.

Still yet another object of the present invention is to provide a new Truck Box Accessory Attachment System that does not require any hand tools.

Even still another object of the present invention is to provide a new Truck Box Accessory Attachment System that makes installation of a truck box accessory quicker from start to finish than previously known mounting systems.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein:

FIG. 5 is a top left side perspective view of an alignment tool of a new Truck Box Accessory Attachment System according to the present invention.

FIG. 6 is a top right side perspective view of a rail cap of a new Truck Box Accessory Attachment System according to the present invention.

DESCRIPTION OF THE PREFERRED EMBODIMENT

Figure 1:
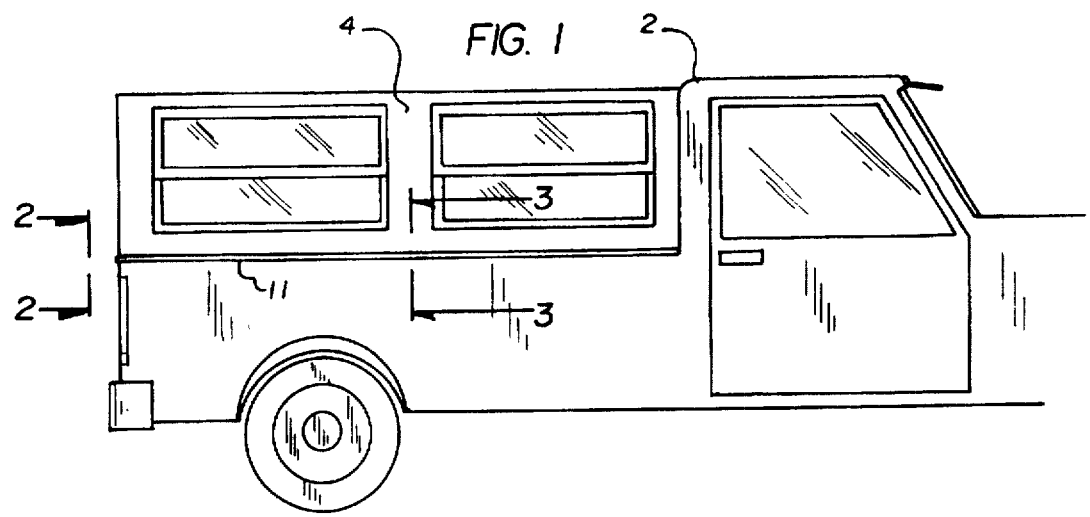
FIG. 1 is a right side elevation view of a new Truck Box Accessory Attachment System according to the present invention.
Figure 2:
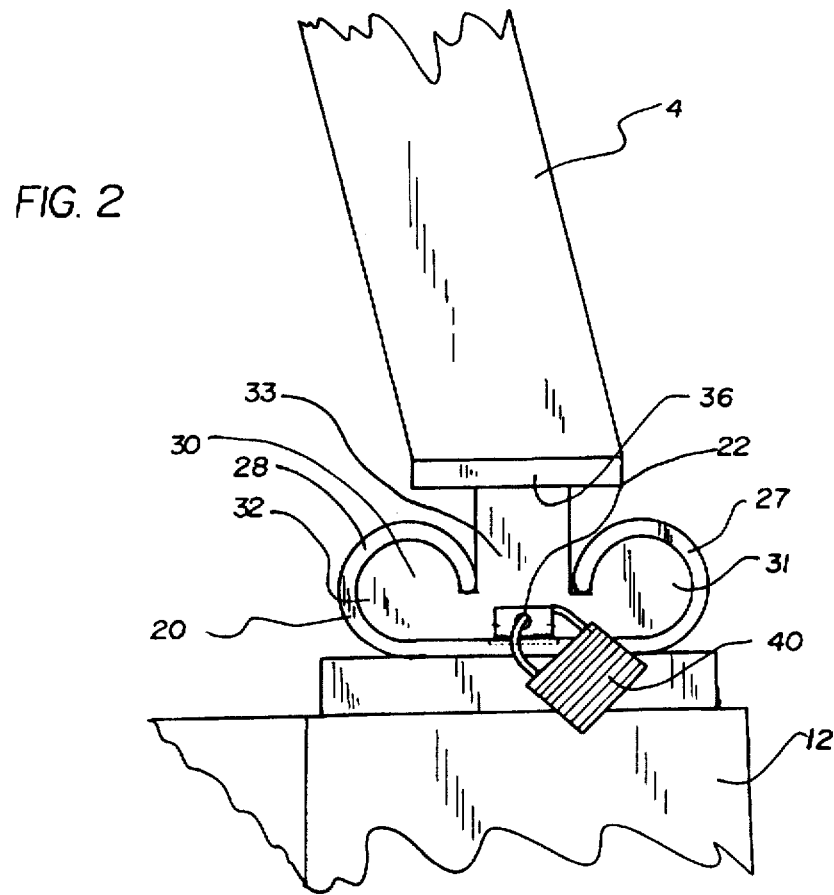
FIG. 2 is an enlarged detailed end view of a truck female rail and an attachment male rail.
Figure 3:
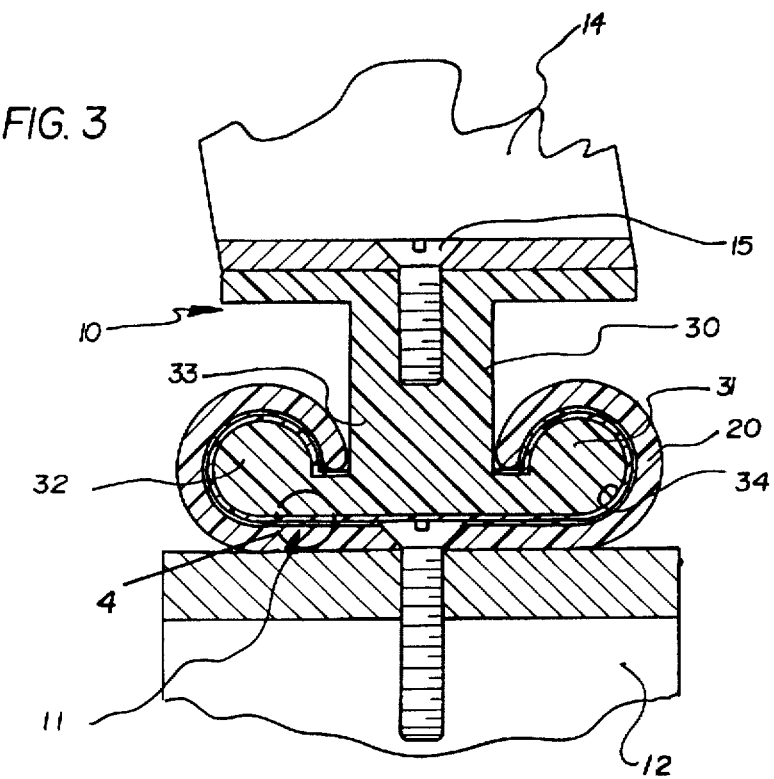
FIG. 3 is a cross sectional view taken along line 3—3 of FIG. 1.
Figure 4:
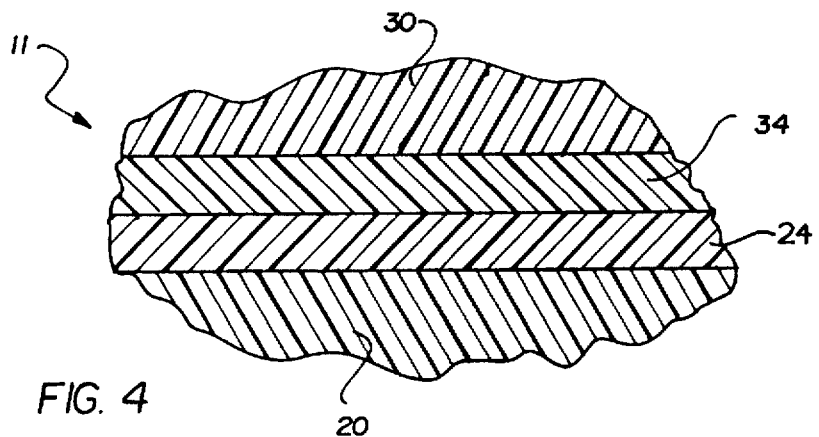
FIG. 4 is an enlarged detailed view of a truck female rail and an attachment male rail at a zoom in detail 4 of FIG. 3.

With reference now to the drawings, and in particular to FIGS 1 through 8 thereof, a new Truck Box Accessory Attachment System embodying the principles and concepts of the present invention and generally designated by the reference numeral 10 will be described.

More specifically, it will be noted that the Truck Box Accessory Attachment System 10 comprises a truck female rail 20, an attachment male rail 30, and a slide locking device 40.

As best illustrated in FIG 1 through 8, it can be shown that a pickup truck 12 is equipped with a truck topper 14 and an insulation seal 11 between the pickup truck 12 and the truck lopper 14. The insulation seal 11 can be further defined as a water tight insulation seal 24 and a slide insulation surface 34.

The truck topper 14 further comprises a bottom edge which is attached to the attachment male rail 30 by a male rail attachment means 15. The attachment male rail 30 is further comprised of a right rail 31, a left rail 32, a support top 36, and a support stem 33. The right rail 31, and the left rail 32 are further defined as rounded extensions protruding out and from the support stem 33 in opposing lateral directions and together, with the support stem 33, create a flat bottom surface.

The support stem 33 extends up vertically from the right rail 31, and the left rail 32 and integrally connects with the support top 36 which is in transverse relationship across the top of the support stem 33. Referring to FIG. 6, the support top 36 can also integrally include a right rain flange 37 and a left rain flange 38 which extend substantially normal and downward from the support top 36.

The truck female rail 20 further comprises a right curl shaped claw 27 and a left curl shaped claw 28 which slidingly mate with the perimeter of the right rail 31 and the left rail 32 and is received by a receiving groove 35.

The truck female rail 20 further includes a flip up lock tab 22 having an aperture and a slide locking device 40 received by the aperture where the locking device 40 is selectively opened by a key and also protects the truck topper 14 or other truck box accessory from theft.

When lot in use, again referring to FIG. 6, the truck female rail 20 can be covered by a rail cap 50 which is comprised of the support top 36, the right rain flange 37, the left rain flange 38, and the receiving groove 35. The support stem 33, the support top 36, the right rain flange 37, and the left rain flange 38, together are spaced away from the right rail 31, and the left rail 32 and therefore define the receiving groove 35. The receiving groove 35 slidingly mates with a similarly shaped structure of the truck female rail 20.

Figure 7:
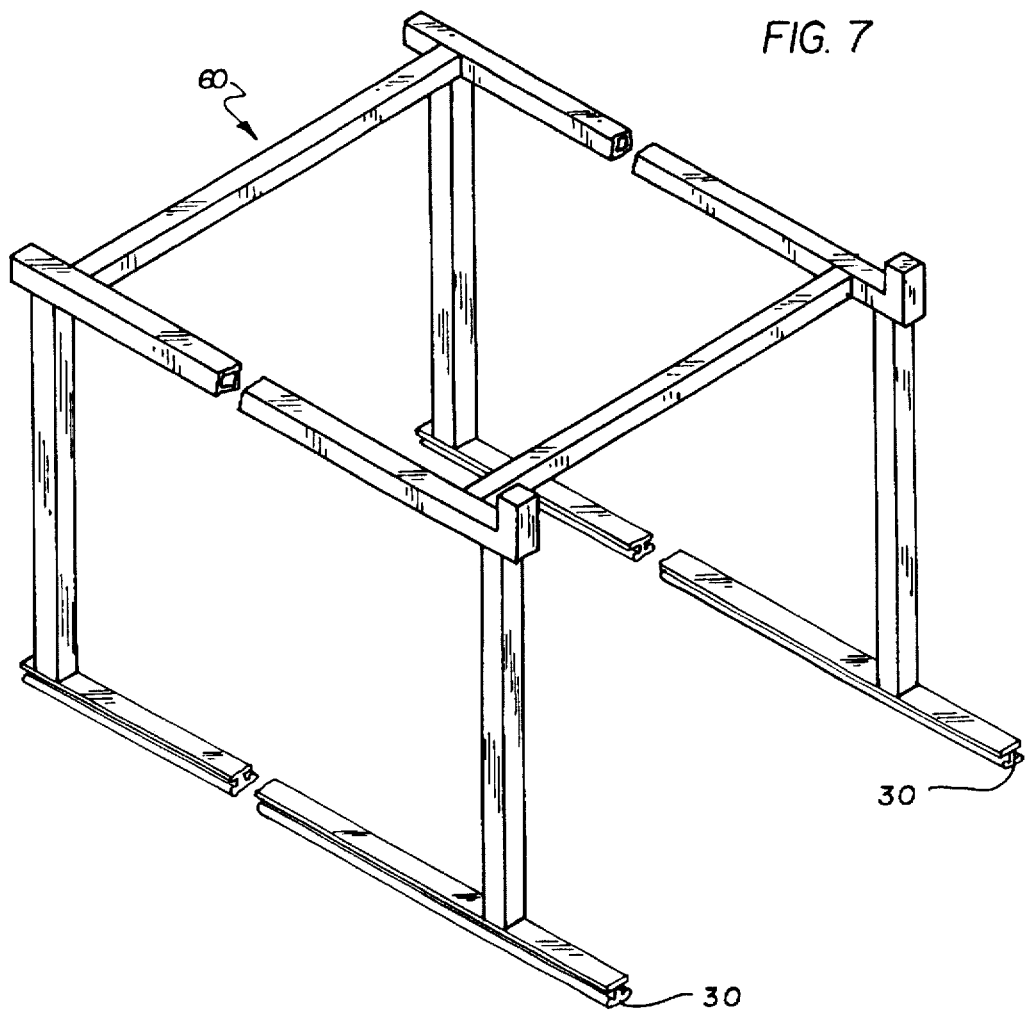
FIG. 7 is a top left side perspective view of an alternate truck box accessory of a new Truck Box Accessory Attachment System according to the present invention.
Figure 8:
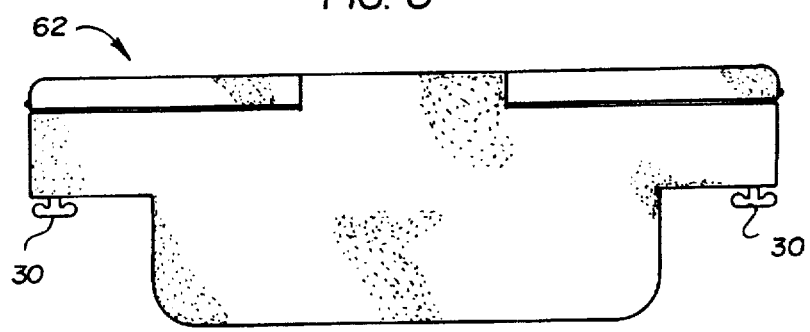
FIG. 8 is a side elevation view of another alternate truck box accessory of a new Truck Box Accessory Attachment System according to the present invention.

The insulation seal 11 is fitted between the sliding surfaces of the truck female rail 20 and the attachment male rail 30. FIGS. 7 and 8 show an alternate truck box accessory 60 and another alternate truck box accessory 62.

In use, the truck female rail 20 is aligned with an alignment tool 70 and attached to a pickup truck 12. The alignment tool 70 is comprised of the support stem 33, the right rail 31, and the left rail 32 and a horizontal tool bar 72 which is fastened at its ends to the support stem 33 by an end attachment means 76 and is lengthwise adjustable by virtue of a rail spacing adjustment means 74 Parallel alignment of the truck female rail 20 at a variety of spaced distances is accomplished by use of the alignment tool 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Truck Box Accessory Attachment System comprising:

a truck female rail, an attachment male rail, and a slide locking device:

wherein the truck female rail and the attachment male rail are insulated and separated from one another by an insulation seal that is comprised of a water tight insulation seal and a slide insulation surface.

2. The Truck Box Accessory Attachment System of claim 1, wherein the attachment male rail is attached to a truck box accessory by a male rail attachment means and where the attachment male rail is further comprised of a right rail, a left rail, a support top, and a support stem where the right rail and the left rail are further defined as rounded extensions protruding out and from the support stem in opposing lateral directions and together, with the support stem, create a flat bottom surface.

3. The Truck Box Accessory Attachment System of claim 2, wherein the support stem extends up vertically from the right rail and the left rail and integrally connects with the support top which is in transverse relationship across the top of the support stem and the support top.

4. The Truck Box Accessory Attachment System of claim 3, wherein the truck female rail further comprises a right curl shaped claw and a left curl shaped claw which slidingly mate with the perimeter of the right rail and the left rail.

5. The Truck Box Accessory Attachment System of claim 4, wherein the truck female rail further includes a flip up lock tab having an aperture and a slide locking device received by the aperture where the locking device is selectively opened by a key and also protects the truck box accessory from theft.

6. The Truck Box Accessory Attachment System of claim 5, wherein the truck female rail can be covered by a rail cap which is comprised of the support top, a right rain flange, a left rain flange, and a receiving groove and where the support stem, the support top, the right rain flange, and the left rain flange, together are spaced away from the right rail, and the left rail, and therefore define the receiving groove and where the receiving groove slidingly mates with a similarly shaped structure of the truck female rail.

7. The Truck Box Accessory Attachment System of claim 6, wherein the insulation seal is fitted between the sliding surfaces of the truck female rail and the attachment male rail.

8. The Truck Box Accessory Attachment System of claim 7, wherein the truck female rail is aligned with an alignment tool and attached to a pickup truck and where the alignment tool is comprised of the support stem, the right rail, the left rail, and a horizontal tool bar which is fastened at its ends to the support stem by an end attachment means and is lengthwise adjustable by virtue of a rail spacing adjustment means and accomplishes parallel alignment of the truck female rail.

\* \* \* \* \*